United States Patent [19]
Stuckey

[11] Patent Number: 4,796,768
[45] Date of Patent: Jan. 10, 1989

[54] LOCKABLE CLOSURE CAP

[76] Inventor: William C. Stuckey, 1503 Virginia Street, E., Charleston, W. Va. 25311

[21] Appl. No.: 148,468

[22] Filed: Jan. 26, 1988

[51] Int. Cl.⁴ ............................................. B65D 55/14
[52] U.S. Cl. ................................... 215/207; 220/210; 70/171
[58] Field of Search .................. 215/207, 98; 220/210; 70/171, 172

[56] References Cited
U.S. PATENT DOCUMENTS
3,343,697  9/1967  Roberts et al. ....................... 215/207

Primary Examiner—George T. Hall
Attorney, Agent, or Firm—Jim Zegeer

[57] ABSTRACT

A lockable closure cap for bottles and containers having externally threaded necks. A closure cap having internal threads coacting with the external threads to seal a bottle has an integrally formed annular cylindrical clutch element projecting upwardly from the closure cap. An annular shell housing having a downwardly depending annular skirt to completely enclose the closure cap and prevent external access to the closure cap. An annular rib coacts between the annular shell housing and the closure cap to retain the two in assembly and rotatable relative to one another. A clutch shoe carrier has a pair of clutch shoes which are retained in position by a spring. A lock mechanism secured in the annular shell housing has a pair of cam elements which engage the clutch shoe means to urge them outwardly against the action of the spring and into engagement with the cylindrical clutch element so as to lock the housing to the closure cap via the clutch mechanism so that rotation of the shell housing causes rotation of the closure cap so as to remove same.

6 Claims, 4 Drawing Sheets

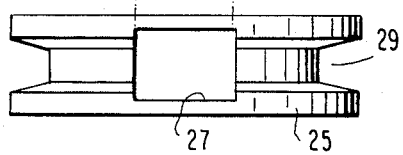
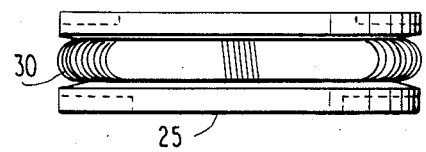
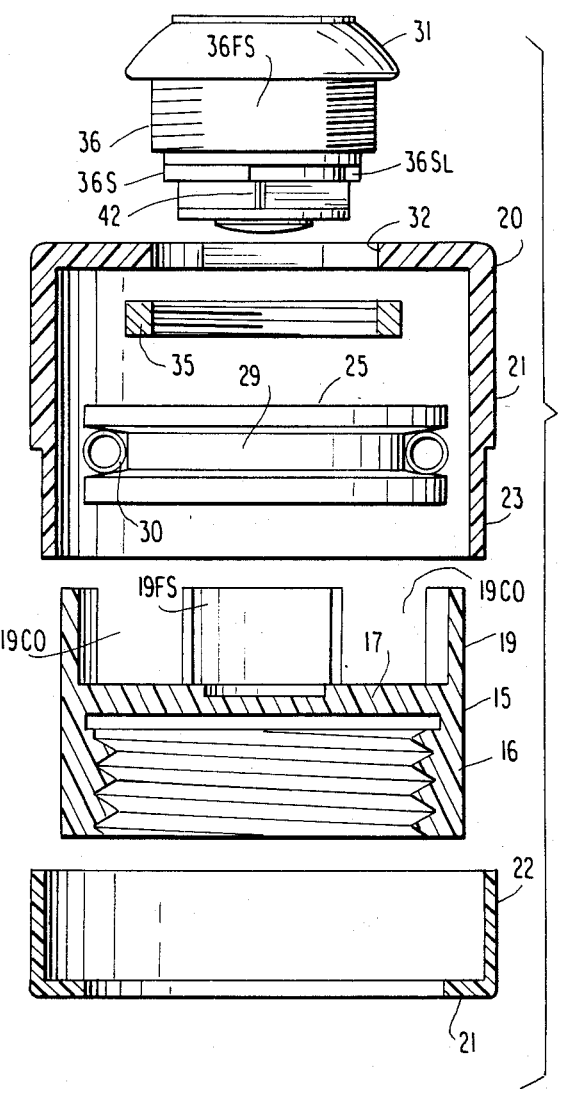
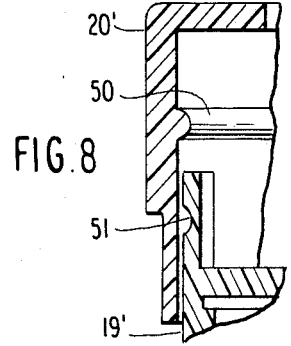
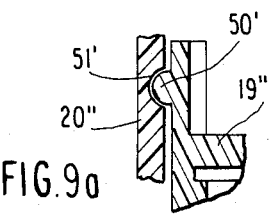
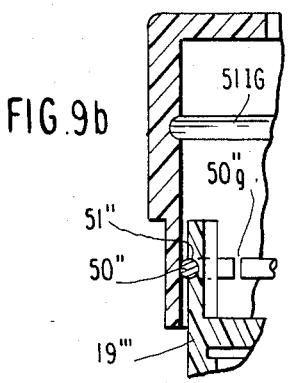

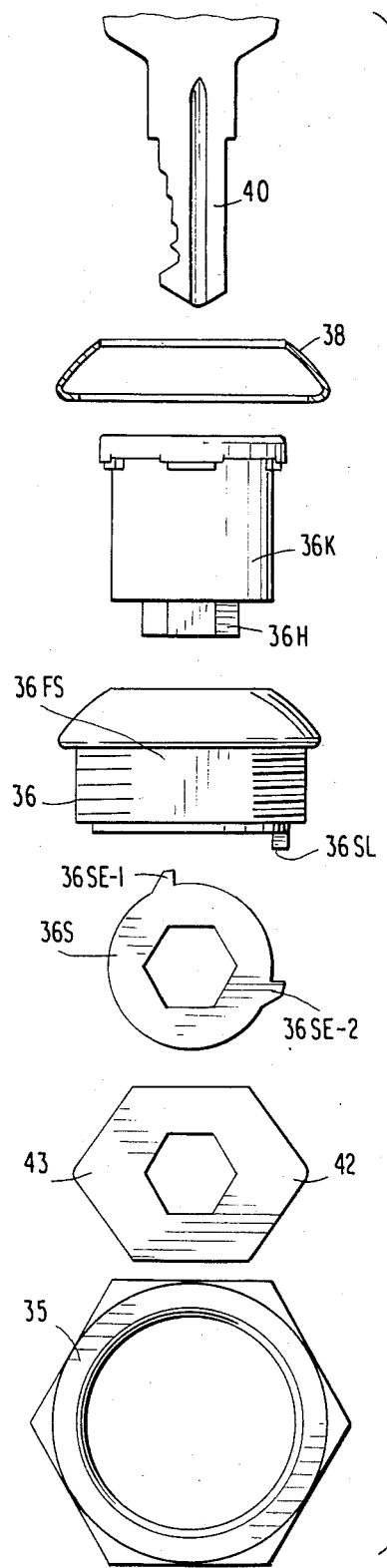
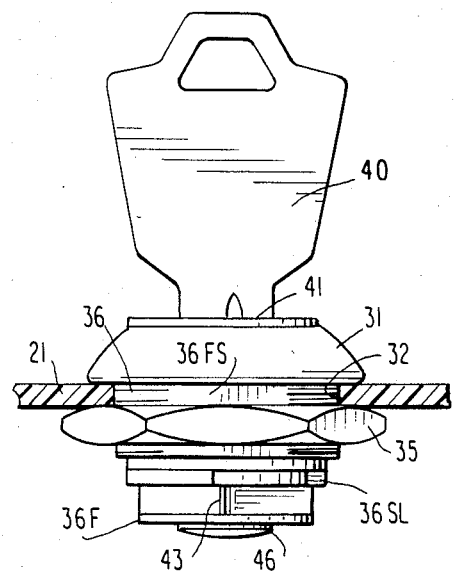
FIG.6b
FIG.6a

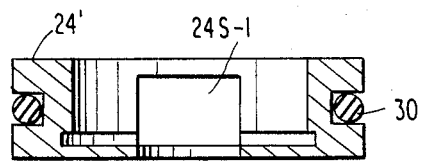
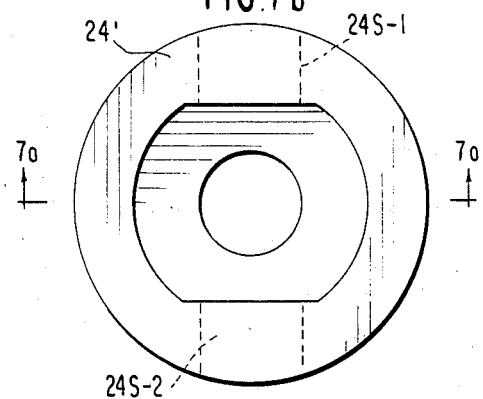
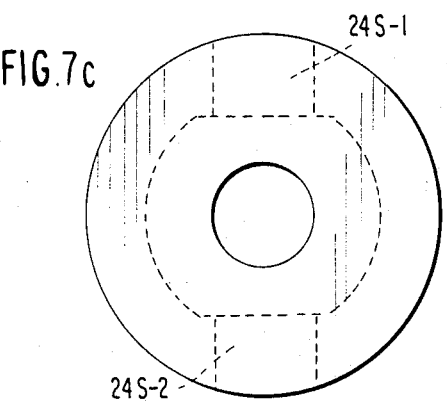
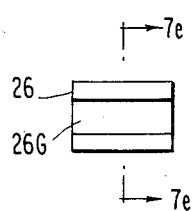
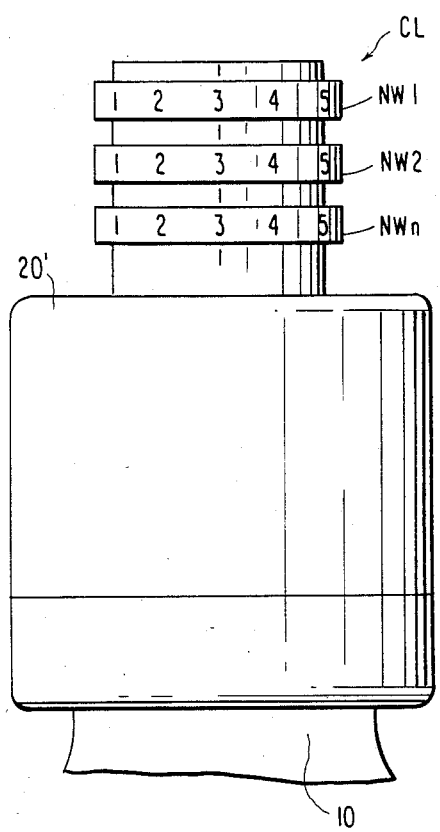

LOCKABLE CLOSURE CAP

BACKGROUND AND BRIEF DESCRIPTION OF THE INVENTION

Safety closure caps are well known in the art. For many years there have been attempts to develop a lockable closure cap to prevent easy access to the contents of the containers such as whiskey bottles, medicines, drugs and the like. For example, in Kempin U.S. Pat. No. 738,917, a lockable bottle stopper is disclosed in which a threaded stopper is threadably engaged with the threaded neck of a receptacle and a capsule or shell encloses the stopper and a swivel joint is provided between the stopper and the capsule. A key engaging mechanism on the stopper and a key for rotating the stopper causes the threads on the stopper to disengage the threads on the neck of the bottle. By turning the key in one direction, the web on the key element itself engage studs on the closure cap or stopper and screws the stopper onto the neck of the bottle and by reversing rotation of the key the webs also engage the studs to rotate the stopper in the opposite direction and unscrew the stopper off the bottle neck. After the stopper has been attached to the bottle and the key removed, the capsule or shell swivels upon the stopper and when turned will not turn the stopper or closure on the bottle. In Rouse U.S. Pat. No. 3,426,932, a tamper proof poison bottle closure is disclosed in which a screw type main cap has a rib formed across the top thereof. An outer or auxiliary companion cap or shell has a deep depending annular rim encompassing the rim of the main cap with the lid portion thereof being spaced vertically above and parallel to the lid portion of the main cap and is swivelly mounted on a journal so that without a key, the shield freely rotates relative to the inner screw cap. A marginally threaded collar provides a rotary gear like pinion which coacts with a pair of rack elements guided in vertical guideways formed in the inner annular ware of the shield, so that upon rotation of the pinion by a key element, the engaged rack elements slide in their respective guideways into engagement with the rib extending across the top of the screw type main cap to thereby engage the outer shell or shield with the screw cap so that it may be removed. Several rotations of the key are required to cause an engagement of the racks with the rib on the top of the main screw cap.

The object of this invention is to provide an improved lockable closure cap and seal for bottles and containers.

The present invention is similar to the above prior art in that it provides an inner seal closure cap which is threadably engaged with the threaded neck portion of a conventional bottle or container, and an outer shield or shell member which is mounted for free rotation relative to the seal closure cap. According to this invention engagement of the seal cap for twisting motion either on or off is provided by an annular cylindrical clutch element which is preferably integrally formed with the closure cap and projects upwardly therefrom. The annular shell housing carries a lock element which actuates a cam member. A clutch shoe carrier has one or more laterally extending guideways which support one or more clutch shoe elements, which are maintained in an unactuated position by a spring or O-ring type spring. When the lock is actuated (either by a key or by a combination), the cam is rotated approximately 90 degrees and causes the ends of the clutch shoes to operably extend laterally relative to the vertical axis of the bottle or container and the cylindrical clutch element to engage and disengage with the annular surface of the annular cylindrical clutch element upon unlocking and locking, respectively, operation of the lock mechanism. Thus, the invention provides a low cost lockable closure cap which is easier to operate and which is more compact and requires fewer special parts or components and is easier to construct and assemble.

DESCRIPTION OF THE DRAWINGS

The above and other objects, advantages and features of the invention will become more apparent when considered with the following specification and accompanying drawings wherein:

FIG. 3 is an side view of the clutch carrier and the clutch shoe elements, FIG. 4 is a side elevational section view showing the clutch elements retained in position by the endless tension spring or O-ring spring, FIG. 5 is a exploded sectional view of a preferred embodiment of the invention as shown in FIG. 1, FIG. 6a is an exploded view of a key lock mechanism and FIG. 6b is an assembled side elevational view of the clock mechanism shown in FIG. 6, FIG. 7a is a sectional view of a modified form of the clutch shoe carrier, FIG. 7b is a top plan view thereof, FIG. 7c is a bottom plan view, FIG. 7d is a top plan view of a clutch shoe elements, and FIG. 7e is an sectional view of FIG. 7d showing in dotted a "O" ring spring or clutch shoe keeper according to the invention, FIG. 8 shows a modification wherein the inner engaging groove and rib are utilized for retaining the unit in assembly, FIG. 9a and FIG. 9b are a sectional view of a further modification, and FIG. 10 is a perspective view of a combination lock mechanism applied to the lockable cap closure of the present invention.

DETAILED DESCRIPTION OF THE INVENTION

Figure 1:
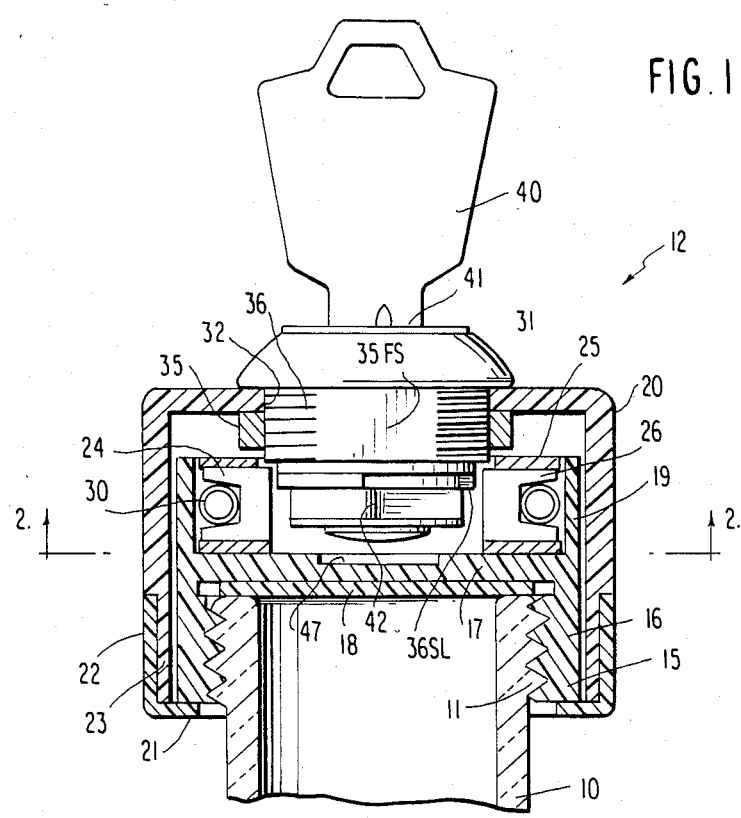
FIG. 1 is a sectional view of a lockable closure for bottles incorporating the invention.

Referring to FIGS. 1 and 5, a bottle having a neck 10 with external threads 11 formed thereon is provided with a lockable closure 12 which, in this preferred embodiment, is a key lockable closure but it will be appreciated that it could be a combination lock, as shown in FIG. 10, in which no key is required. A closure cap 15 having an internally threaded annular sleeve 16 and cap member 17 provide the actual normal seal for the bottle or container 10 and may include a sealing disk 18 which may be plastic, cork, foam, etc. Integrally formed with the closure cap 15 is an upwardly extending annular cylindrical clutch element 19. By way of perspective, in the way of dimensions, the length of the closure cap 15 and its integrally formed cylindrical clutch element 19 may be about three-quarter of an inch in a key lock device. An annular shell housing 20 has an annular skirt 21 which has an axial length equal to or greater than the axial length of the closure cap, including the integrally formed cylindrical clutch element 19. An annular rib member 21 having an upstanding annular portion 22 telescopically received on the depending portion 23 of skirt 21 and is adhesively or ultrasonically secured thereto so that the annular rib 21 supports the closure cap 15 within the shell for free rotation therein. That is to say, the closure cap 15 and its integrally formed annular clutch element 19 are maintained in operative and freely rotatable relation and position in shell housing 20 by annular rib or flange 21, resulting in a less complex manufacturing and assembly process. A pair of clutch shoes 24, 25 are carried by annular clutch carrier 25 and slide laterally in slots 27, 28 in the clutch carrier 25. Clutch carrier 25 has an annular groove 29 and each of the clutch shoe elements 24, 25 have corresponding grooves 24G, 25G therein so that a spring 30 which may be a helical coil spring under tension or simply an O-ring spring having high elasticity properties serves to retain the clutch shoe elements in a disengaged position.

A conventional key lock mechanism 31 (shown in FIGS. 6a, and 6b) is received in opening 32 of annular shell housing 21 and is securely maintained therein by a lock nut 35 which is threadably received on the externally threaded lock casing 36. Thus, the lock is maintained securely in the annular shell housing between the lock nut 35 and escutcheon plate 38 by the tightening of lock nut 35. A conventional key 40 is received in a key slot 41 to operate the tumblers or discs (not shown) of the conventional lock 31. As shown in FIGS. 6a–6b, threaded lock casing 36 rotatably receives key lock component 36K and coacts with key 40 and lock pins or tumblers (not shown). A hexagonal projection 36H depends from key lock component 36 and receives a stop member 36S and cam member 42-43 which are rotatable therewith and a fastener washer 36F is secured to the end of hexagonal projection 36H to retain the cam member and stop member in assembly. A downwardly projecting stop lug 36SL is engaged by stop ears 36SE-1, 36SE-2 to limit rotation of key lock component 36K to about 90 degrees, and thus limits the rotation of cam members 42, 43 to about 90 degrees. This assures that the cams do not over shoot the inner ends of clutch shoe members 24, 25 and when at either stop position, the clutch shoe members are fully retracted or fully extended laterally, e.g., that they are fully engaged with annular clutch cylinder 19 or fully disengaged from annular clutch cylinder 19.

Hole 32 is preferably not round, but has one or more flat sides to conform to the flat sides 35FS on lock casing 36 to prevent rotation of the lock casing 36 when the key 40 is rotated.

Figure 2:
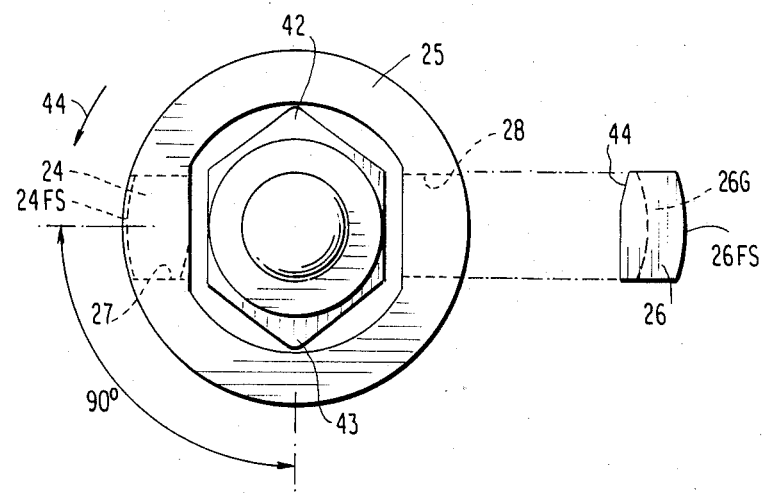
FIG. 2 is a sectional view through lines 2—2 of FIG. 1 showing the lock cam elements for actuating the clutch elements in the clutch carrier.

Cam elements or members 42, 43 are rotated with the rotation of a proper key 40 in slot 41. In this preferred embodiment, a quarter (90 degrees) of a turn of a proper key turns the projecting cam elements 42, 43 in a counter-clockwise direction as indicated by the arrow 44 (FIG. 2b). The cam elements 42, 43 are designed to engage the smoothly sloped peripheral edges 44 of the clutch shoe means 24, 26 which, when extended laterally, engage and/or disengage with the cut-outs 19CO in annular surface 19FS of the annular cylindrical clutch element 19. The outer edges 24FS, 26FS of the clutch shoe elements 24 and 26 respectively, are also designed to engage the internal notches or cut outs 19CO surfaces of the cylindrical clutch element only upon operation of the key to laterally project said clutch elements outwardly. The inner annular surfaces 19FS may be knurled or roughened, as may be the surfaces 24FS and 26FS. So that if the cut-outs are not engaged, there is high frictional engagement between the cam shoe's 24, 26 and the inner surface 19FS to apply twisting torque to the closure 15.

The spring member 30 serves to assure disengagement of the clutch shoe elements with the cylindrical clutch portion 19 when the key is operated to lock the assembly bottle and the proper positioning of the shoes for engagement by the cams. The bottle or container is in a "locked" condition when the shell housing 20 is able to freely rotate on relative to the seal cap closure 15. The lower end of the lock assembly 31 housing has an annular projection 46 which rests in and spaced from a shallow recession in the closure cap. Instead of a key lock, a conventional combination lock CL with number wheels NW, NW2...NWn can be used to operate the cams.

Referring now to FIGS. 8, 9a and 9b, in these modifications the lower annular rib 21 and its upwardly extending skirt portion 22 are eliminated. An annular rib or ring 50 is molded or otherwise placed in the annular shell housing 20'. In FIG. 8, a complementary annular groove 51 is formed in the upwardly extending cylindrical clutch element 19'. After insertion and securement of the lock member barrel 36 in the shell opening 32, the clutch shoe carrier and spring elements are simply dropped or telescoped upon the lock barrel 36 and then the closure cap and its annular cylindrical clutch element 19' are pushed into the housing with the rib 50, which in this case is rounded, camming the upper edge of the annular cylindrical clutch element 19' inwardly until the annular groove 51 is reached. The rib 51 is formed in the upper end of cylindrical clutch element 19' so as to provide adequate space for the clutch shoe elements 24 and 26 to sufficiently engage and frictionally grip the internal walls of the annular cylindrical clutch element 19'. In the arrangement shown in FIG. 9a, the annular groove 51' is formed in the wall of the annular shell housing 20" and the annular rib 50' is formed in the outer surface of the annular cylindrical clutch element 19" to thereby avoid the spacing requirement set forth in connection with FIG. 8. In FIG. 9b, a steel tension ring 50", which has a gap 50"g is seated in annular groove 51" in clutch element 19''' and is compressed upon being pressed into shell housing 20 and expands upon reaching internal annular groove 51IG.

It is evident that the present lockable closure cap device is easier to construct and assemble than the prior art and it does not require the multiple locations of a key in order to operate. Furthermore, it does not require the complex shapings of the interior of the shell nor the interfitting relationship of the component parts as required by the prior art. Moreover, it requires less component parts and uses a low cost conventional locking mechanism.

The foregoing is illustrative of the preferred embodiments of the invention and numerous modifications, adaptations and changes will readily appear to those skilled in the art and it is intended that such obvious modifications and adaptations as would be obvious to those skilled be encompassed within the spirit and scope of the invention as defined in the appended claims.

What is claimed is:

1. A lockable closure for bottles and containers having a neck and external threads formed on said neck,
   a closure cap having internal threads coacting with said external threads to seal said bottle, and an annular cylindrical clutch element projecting from integrally formed with said closure cap and rotatable therewith, an annular shell housing having an annular skirt, said skirt having an axial length equal to or greater than the axial length of said closure cap and enclosing same to prevent external twisting access to said closure cap when engaged with the external threads on said neck, annular rib means extending from one of said annular shell and said closure cap and a coacting shoulder on the other one of said annular shell and said closure cap for retaining said closure cap within said annular shell, and said annular shell housing having a lock receiving wall at one end thereof and a lock mechanism secured in said lock receiving wall, said lock mechanism having laterally movable clutch shoe means operable to extend laterally to drivingly engage and disengage with said annular cylindrical clutch element upon operation of said lock mechanism.

2. The bottle closure defined in claim 1 wherein said lock mechanism has a pair of cam member means, said clutch shoe means including an annular clutch shoe carrier surrounding said lock mechanism, an annular groove formed in the outer annular surface of said clutch shoe carrier and an annular spring member seated in said groove below said annular surface, said clutch shoe carrier including at least one radially extending guide slot, and a clutch shoe in said guide slot, said clutch shoe having surface for engaging the cylindrical clutch element upon operation of said lock mechanism, said annular spring being constantly under tension and in engagement with said clutch shoe to move same to a disengaged position whereby said annular shell housing is freely rotatable relative to said closure cap.

3. The bottle closure defined in claims 1 or 2 wherein said cylindrical clutch element has one or more cut-outs formed therein for receiving said laterally moveable clutch shoe means to effect a driving engagement with said closure cap.

4. The bottle closure defined in claims 1, 2 or 3 wherein said annular rib means is formed on the lower end of said annular shell housing and said coacting shoulder is constituted by the lower end of said closure cap.

5. The bottle closure defined in claims 1, 2 or 3 wherein said annular rib is formed on the interior of said annular shell housing near the upper end thereof, and said annular cylindrical clutch element has a complementary annular groove formed therein, the upper edge of said annular cylindrical clutch being adapted to be cammed inwardly by said annular rib and spring outwardly upon said annular rib seating in said annular groove.

6. The bottle closure defined in claims 1, 2 or 3 wherein said annular rib is formed on the external surface of said annular cylindrical clutch and said annular shell housing has an internal groove formed near the upper end thereof, the upper edge of said annular cylindrical clutch being adapted to be cammed inwardly by said annular rib and spring outwardly upon said annular rib seating in said annular groove.

* * * * *